United States Patent
Hasegawa

(10) Patent No.: US 8,151,954 B2
(45) Date of Patent: Apr. 10, 2012

(54) VIBRATION DAMPING APPARATUS

(75) Inventor: Koichi Hasegawa, Kasugai (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 671 days.

(21) Appl. No.: 12/068,435

(22) Filed: Feb. 6, 2008

(65) Prior Publication Data

US 2008/0197549 A1 Aug. 21, 2008

(30) Foreign Application Priority Data

Feb. 16, 2007 (JP) ................................ 2007-035794

(51) Int. Cl.
*F16F 7/10* (2006.01)
(52) U.S. Cl. ...................................................... 188/380
(58) Field of Classification Search ................... 267/192, 267/193, 228, 229, 243, 244, 245, 246, 259, 267/27, 30, 36.1, 41; 280/124.102, 124.17, 280/124.174, 124.106; 403/225–227; 188/378–380
See application file for complete search history.

(56) References Cited

U.S. PATENT DOCUMENTS

| | | | |
|---|---|---|---|
| 1,737,048 A | 11/1929 | Hunt | |
| 1,835,575 A * | 12/1931 | Sanders et al. | 403/225 |
| 2,467,548 A * | 4/1949 | Bradley | 403/227 |
| 2,659,595 A * | 11/1953 | Coda | 267/30 |
| 3,254,902 A * | 6/1966 | Vittone | 280/124.106 |
| 3,799,571 A * | 3/1974 | Sudberry | 280/124.174 |
| 4,125,276 A * | 11/1978 | Levasseur | 280/124.108 |
| 5,007,660 A * | 4/1991 | Orndorff et al. | 280/124.102 |
| 5,695,027 A | 12/1997 | von Flotow et al. | |
| 6,019,384 A * | 2/2000 | Finck | 280/124.17 |
| 6,508,343 B2 | 1/2003 | Misaji et al. | |
| 6,722,481 B2 | 4/2004 | Maeda et al. | |
| 6,854,721 B2 | 2/2005 | Kato et al. | |
| 6,991,077 B2 | 1/2006 | Maeno et al. | |
| 2001/0026039 A1 | 10/2001 | Hasegawa et al. | |
| 2006/0231993 A1 | 10/2006 | Collyer et al. | |

FOREIGN PATENT DOCUMENTS

| | | |
|---|---|---|
| DE | 879 774 | 6/1953 |
| JP | U-4-39440 | 4/1992 |
| JP | A-8-109948 | 4/1996 |
| JP | A-2003-28234 | 1/2003 |
| JP | A-2003-184946 | 7/2003 |
| JP | A-2003-237335 | 8/2003 |
| JP | A-2005-98008 | 4/2005 |

OTHER PUBLICATIONS

Sep. 22, 2011 Office Action issued in German Patent Application No. 10 2008 008 100.0-13 (with translation).

* cited by examiner

*Primary Examiner* — Melanie Torres Williams
(74) *Attorney, Agent, or Firm* — Oliff & Berridge, PLC

(57) ABSTRACT

A vibration damping apparatus wherein a mass member is elastically supported by a spring member on a vibrating member to be damped for constituting a secondary vibrating system. The spring member is a metal plate spring with one end being attached to the mass member and the other end being attached to the vibrating member. A rubber bushing having an inner and an outer tube member positioned spaced apart from one another in a diametrical direction and linked in the diametrical direction by a rubber elastic body. One of the inner shaft member and the outer tube member of the rubber bushing is fastened to the plate spring while the other is fastened to the mass member or the vibration damping apparatus, whereby the moment is exerted in the torsional direction of the rubber bushing during displacement of the mass member by vibration to be damped.

9 Claims, 4 Drawing Sheets

VIBRATION DAMPING APPARATUS

INCORPORATED BY REFERENCE

The disclosure of Japanese Patent Application No. 2007-035794 filed on Feb. 16, 2007, including the specification, drawings and abstract is incorporated herein by reference in its entirety.

BACKGROUND OF THE INVENTION

1. Field of the Invention

The present invention relates to a vibration damping apparatus that constitutes a secondary vibrating system for a vibrating member to be vibration-damped, and that is adapted to reduce vibration of a vibrating member in a primary vibrating system. More particularly, the present invention relates to a vibration damping apparatus of novel construction affording outstanding vibration damping action against low-frequency, large amplitude vibration by a vibrating member of large mass.

2. Description of the Related Art

A dynamic damper composed of a mass-spring system and designed to be attached to a vibrating member of a primary vibrating system, in order to constitute a secondary vibrating system therefor, is known in the art as one type of vibration damping apparatus adapted to reduce vibration in vibrating members whose vibration poses a problem, such as the body of a car. Such an apparatus is disclosed in U.S. Pat. No. 6,991,077, for example.

The frame of a car body may be subjected to input of low-frequency, large amplitude vibration when, for example, the car drives over a bump. Due to the large mass of the car body frame, it will be necessary to use a component of large mass as a mass member, in order to effectively damp such vibration. Given that the mass member has a large mass, it will be necessary to establish a sufficiently low spring constant in order to set the tuning frequency of the secondary vibrating system constituted by the mass-spring system within a low-frequency range.

In typical dynamic dampers employing a compression rubber elastic body as the spring member, is was necessary for the member to have a small cross-sectional area in order to achieve the desired low spring constant. However this arrangement created the problem that it becomes difficult to ensure sufficient support strength for such a mass member of large mass.

It has also been contemplated to use a plate spring made of metal, in order to achieve low spring constant while ensuring adequate support strength.

However, due to the use of mass members having large mass, the use of metal plate springs poses a concern with regard stress concentrations arising in fastening locations to the mass member and to the supporting member (damped member), and to possible fatigue rupture caused thereby. Particularly where a "cantilever structure" by the plate spring for the mass member has been employed, durability of the plate spring will tend to become a greater problem.

In order to alleviate the problem of stress concentration in the plate spring, a "both-sides holding structure" whereby the mass member is supported from both the left and right sides by respective plate springs could also be contemplated. However, where such a both-sides holding structure is employed for the mass member, since the plate springs per se undergo substantially no elongation or contraction in the lengthwise direction, during displacement of the mass member they will not be able to respond to changes in distance between the mass member and the supporting member which are linked by the plate springs. As a result, the linear region of the mass-spring system will be extremely small due to the tensile rigidity of the plate springs in their lengthwise direction, creating the problem of difficulty in achieving the required vibration damping action against low-frequency, large amplitude vibration in particular.

In order to address the problem of stress concentration in the plate spring and of ensuring an adequate linear region, it could be contemplated to employ a sufficient length for the plate springs, for example. However, achieving satisfactory characteristics would require excessive plate spring length dimension, making the dynamic damper much too large for practical purposes, and accordingly this is not an effective solution.

SUMMARY OF THE INVENTION

It is an object of the present invention to provide a vibration damping apparatus of novel structure that, while maintaining compact size and excellent durability, affords substantially linear spring characteristics over a large region of displacement by the mass member, and that thereby exhibits excellent vibration damping action against low-frequency, large amplitude vibration input by a vibrating member having large mass.

The above and/or optional objects of this invention may be attained according to at least one of the following modes of the invention. The following modes and/or elements employed in each mode of the invention may be adopted at any possible optional combinations.

A first mode of the invention provides a vibration damping apparatus a vibration damping apparatus comprising: a mass member; and a spring member for elastically supporting the mass member on a vibrating member to be damped for constituting a secondary vibrating system for the vibrating member, the spring member comprising at least one plate spring of metal, one end of the plate spring being attached to the mass member and the other end of the plate spring being attached to the vibrating member; and a rubber bushing having an inner shaft member and an outer tube member positioned spaced apart from one another in a diametrical direction and linked in the diametrical direction by a rubber elastic body, the rubber bushing being positioned at a mounting location of the plate spring to at least one of the mass member and the vibrating member, with one of the inner shaft member and the outer tube member of the rubber bushing fastened to the plate spring while the other of the inner shaft member and the outer tube member is fastened to the mass member or the vibration damping apparatus where the rubber bushing is positioned, whereby moment is exerted in a torsional direction of the rubber bushing during displacement of the mass member by vibration to be damped.

In the vibration damping apparatus of structure according to this mode, by employing a plate spring of metal, the spring constant of the secondary vibrating system can be set to a very low level, whereby effective vibration damping action against low-frequency vibration can be achieved. In the present mode, in the event of appreciable displacement the mass member caused by input of high-amplitude vibration etc., moment will be exerted in the torsional direction on the rubber elastic body provided to the rubber bushing, inducing deformation of the rubber elastic body. This will permit change in the distance between the plate spring support points, i.e. in the distance between the plate spring location of attachment to the mass member and the location of attachment to the vibrating member, as the rubber elastic body is induced to deform; and inhibit sharp change in characteristics of the plate spring due to tensile rigidity of the plate spring. As a result, substantially linear characteristics will be achieved across the region of displacement of the mass member, and it will be possible to consistently use the bending elasticity of the plate spring and achieve excellent vibration damping action against low-frequency vibration as well.

Moreover, since a large region giving linear characteristics of the plate spring is assured, it is possible to expand the possible tuning range for vibration damping without having to increase the length dimension of the plate spring, and the vibration damping apparatus can be compact in size while durability of the plate spring is improved. Furthermore, due to attenuating action by the rubber elastic body, it is possible to suppress the peaks in the vibration transmission rate observed respectively in frequency regions both on the low-frequency end and the high-frequency end of the tuning frequency band of the secondary vibrating system in the vibrating member of the primary vibrating system, making it possible to achieve good vibration damping action across the entirety of a wide frequency range.

Additionally, in the present mode, by employing the rubber bushing it is possible to achieve consistent elasticity both with respect to moment of the plate spring acting on the linking section with the plate spring, and to tensile load of the plate spring. Specifically, for the purpose of permitting change of distance between the plate spring support points during displacement of the mass member, it would be conceivable, for example, to use a rubber plate and permit change of distance between the plate spring support points through shear deformation of the rubber plate. However, with a rubber plate it is difficult to ensure adequate durability with respect to a mass member of large mass, and it will be necessary to devise some failsafe mechanism against fatigue rupture etc. caused thereby. A further problem with a rubber plate is that it is difficult to deal with change in the load input direction exerted during displacement of the mass member.

On the other hand, where a rubber bushing of structure according to the present invention is employed, the moment of the plate spring will be exerted in the torsional direction of the rubber elastic body, thus achieving low spring characteristics in the rotational direction with respect to the rubber bushing, and achieving high spring characteristics in the axis-perpendicular direction to the rubber elastic body while permitting the distance between the plate spring support points to change easily during displacement of the mass member, whereby durability with respect to a mass member of large mass may be assured as well. Moreover, because the inner shaft member passes through the outer tube member, if for example the rubber elastic body should rupture, the mass member will be prevented from separating from the supporting member (damped member), thus achieving a failsafe mechanism without the need to provide any special structure.

A second mode of the present invention provides the vibration damping apparatus according to the first mode, wherein the spring member comprises a plurality of plate springs of metal, and at least one plate spring is positioned at a location away from at least another plate spring in a direction of vibration to be damped.

In the vibration damping apparatus of structure according to this mode, the mass member is supported from both sides in the vibrating direction. The mass member can be supported more stably thereby, and tilting or other such irregular displacement of the mass member can be inhibited when vibration is input, thereby affording more consistent vibration damping action.

A third mode of the present invention provides the vibration damping apparatus according to the first or second mode, wherein the spring member comprises a plurality of plate springs of metal, and a center axis of elastic support composed of the plurality of plate springs coinciding with a vertical direction passing through a center of gravity of the mass member.

In the vibration damping apparatus of structure according to this mode, it is possible to inhibit irregular displacement in the twisting direction etc. during displacement of the mass member, and to achieve more consistent deformation of the plate springs and displacement of the mass member in the vertical direction. Consequently, more consistent and efficient vibration damping action can be achieved.

A fourth mode of the present invention provides the vibration damping apparatus according to any one of the first through third modes, wherein a pair of the plate springs are constituted using a single plate spring stuff, by fastening a lengthwise center section of the plate spring stuff to the mass member with two end sections of the plate spring stuff projecting to either side in a horizontal direction from the mass member; and attaching the rubber bushing to a distal end portion of each of the pair of the plate springs that project out from the mass member.

In the vibration damping apparatus of structure according to this mode, the mass member has a "both sides supporting structure" supported by the center section of a single plate spring stuff. The mass member can therefore be supported more stably than with a "single cantilever structure" in which it is supported on one side, and support of the mass member is distributed between the two sides of the plate spring stuff, whereby the durability of the plate spring can be improved.

Moreover, since the mass member is fastened to the center section of the plate spring stuff, it is a simple matter to arrange the center axis of elastic support of the plate spring so as to pass through the center of gravity of the mass member, whereby the structure according to the preceding third mode can be realized easily.

It should be appreciated that the plate spring in the present invention refers to a member extending between the mass member and the vibrating member. It is not necessary for a single plate spring to be composed of a single independent component. For example, in the present mode, each plate spring is constituted by a section of a plate spring stuff which extends from the center section to one end section thereof, whereby a pair of plate springs are constituted by the single plate spring stuff.

A fifth mode of the present invention provides the vibration damping apparatus according to any one of the first through fourth modes, wherein the plate spring has a bending portion that appears bent in side view, situated between a location of attachment to the mass member and a location of attachment to the vibrating member.

In the vibration damping apparatus of structure according to this mode, by imparting the plate spring with a bending portion, the bending portion of the plate spring will undergo extension and contraction in the event of appreciable displacement of the mass member caused by input of large-amplitude vibration. Thus, a larger substantial length dimension for the plate spring can be assured, thereby permitting change in distance between the plate spring support points in association with displacement of the mass member. Consequently, deformation of the rubber elastic body of the rubber bushing, and linear characteristics of the plate spring in cooperation with expanding/contracting deformation of the bending portion, can be assured over a wider range, and thus better vibration damping action can be achieved.

A sixth mode of the present invention provides the vibration damping apparatus according to any one of the first through fifth modes, wherein the mass member is constituted by a damper mass having an independent mass member positioned housed within a housing space formed in an interior of a hollow housing, with a minute gap provided between the independent mass member and an inside wall of the housing space to permit free displacement of the independent mass member independently of the hollow housing.

In the vibration damping apparatus of structure according to this mode, input of vibration inducing displacement of the damper mass will cause the independent mass member to undergo ricochet displacement with respect to the hollow housing and strike into contact against it. Amplitude-reducing effect on the vibrating member will be produced on the basis of this contact against the hollow housing by the independent mass member. Moreover, a state substantially identical to a greater apparent loss coefficient will be observed in the secondary vibrating system composed of the damper mass and the plate spring, and the peaks of vibration transmission rate observed respectively in frequency regions both on the low-frequency end and the high-frequency end of the tuning frequency of the secondary vibrating system in the vibrating member of the primary vibrating system will be suppressed, making it possible to achieve good vibration damping action across the entirety of a wide frequency range.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
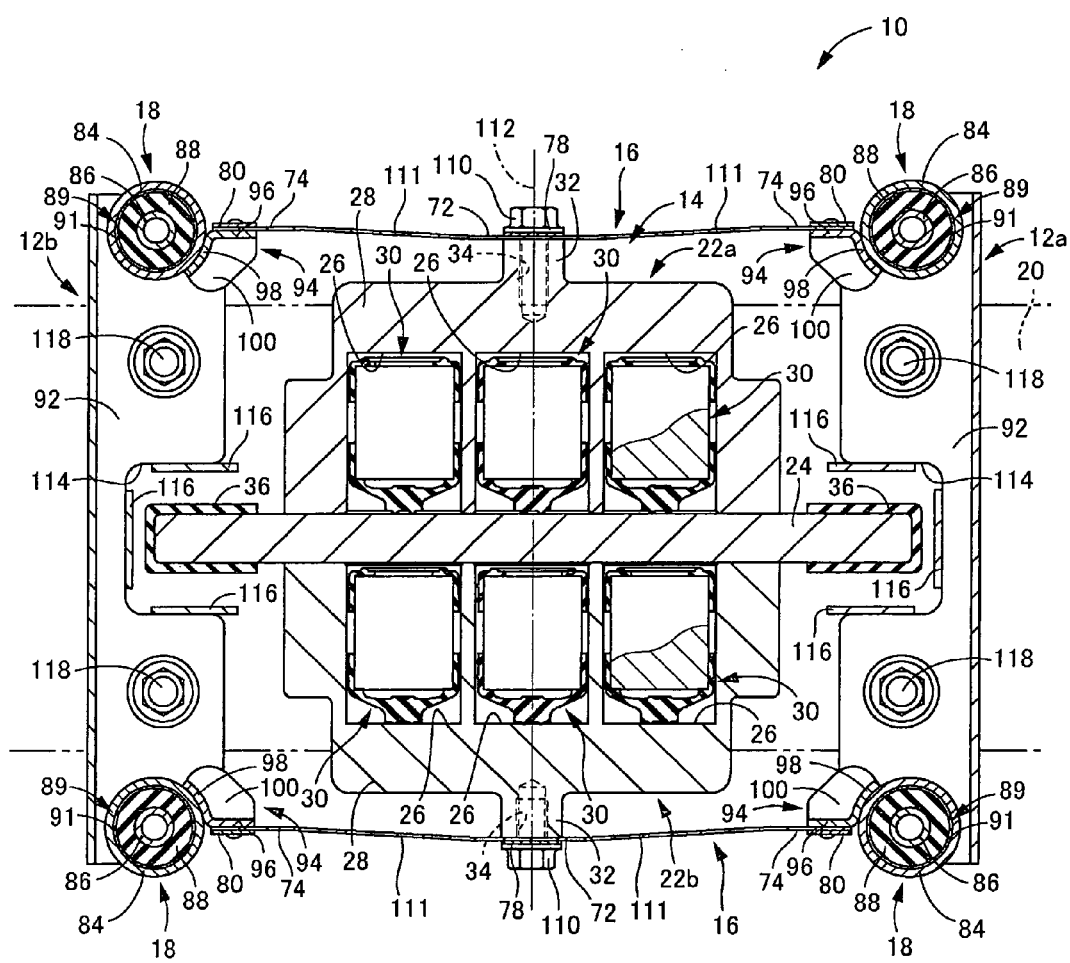
FIG. 1 is a vertical cross sectional view of a vibration damping apparatus of construction according to a first embodiment of the present invention.

FIG. 1 depicts a vibration damping apparatus 10 pertaining to a first embodiment of the present invention. The vibration damping apparatus 10 includes a damper mass 14 constituting a mass member elastically supported with respect to a pair of brackets 12a, 12b by a pair of plate spring stuffs 16 constituting the plate spring stuffs, and rubber bushings 18 attached to these plate spring stuffs 16 at both ends. The brackets 12a, 12b are attached to a vibrating member 20 such as the body frame of a car, while the damper mass 14 is elastically supported by the plate spring stuffs 16 and the rubber bushings 18 with respect to the vibrating member 20, thereby constituting a secondary vibrating system for the vibrating member 20 of the primary vibrating system. FIG. 1 depicts the plate spring stuffs 16 displaced slightly downward (downward in FIG. 1) due to the effect of gravity on the damper mass 14 in the stationary state. Unless indicated otherwise, vertical direction herein refers to the vertical direction in FIG. 1, and in the present embodiment, the vertical direction is the plumb-vertical direction as well.

To describe in greater detail, the damper mass 14 is composed of an upper damper mass 22a and a lower damper mass 22b of mutually similar structure, attached together with a fastener plate 24 having a generally rectangular shape of prescribed thickness. Since the upper damper mass 22a and the lower damper mass 22b have mutually similar structure, the following discussion will take the upper damper mass 22a by way of example.

The upper damper mass 22a includes a hollow housing 28 having a number (in the present embodiment, three) of housing spaces 26 formed in its interior; and mass members 30 constituting independent mass members, housed within each of the housing spaces 26. The hollow housing 28 has an overall shape resembling a battery of three inverted cups, produced by arranging three bottomed tubes open at the bottom in a row with their center axes extending parallel to one another and joining their adjacent walls. Thus, the hollow housing 28 will include three housing spaces 26 that are each extending linearly in the vertical direction with unchanging circular cross section and open at the bottom face, and that are arrayed at prescribed intervals on a straight line.

A support projection 32 for linking and support purposes is formed projecting upward from the center of the upper face of the hollow housing 28; a screw hole 34 for mounting purposes is provided in this support projection 32. Furthermore, the lower end section of the hollow housing 28 projects slightly towards the outside peripheral direction at either end in the lengthwise direction (sideways in FIG. 1), which represents the direction of array of the three housing spaces 26.

The hollow housing 28 is formed of metal or similar material having rigidity and strength sufficient to not experience deformation etc. due to contact of a mass member 30, which will be described later. In consideration of the ease of the forming operation, production cost, and so on, it may be formed of cast iron, for example. In order to ensure a high degree of dimensional accuracy for each of the housing spaces 26, it will be preferable to finish the peripheral walls and upper walls by a cutting process subsequent to casting.

Meanwhile, the fastener plate 24 is affixed to the lower side of the hollow housing 28. The fastener plate 24 is formed of metal or similar material having rigidity and strength sufficient to not experience deformation etc. due to contact against a fastener wall portion 116, discussed later; in consideration of the ease of the forming operation, production cost, and so on, it may be formed of cast iron, for example. The fastener plate 24 is generally rectangular in shape and has prescribed thickness dimension; its shape is such that it can continuously cover the openings of the three housing spaces 26 formed in the hollow housing 28, while in the lengthwise direction which represents the direction of array of the housing spaces 26 (the sideways direction in FIG. 1), it has length dimension so as to project out beyond the hollow housing 28. Cushion covers 36 formed of a rubber elastic body are attached to the two lengthwise ends of the fastener plate 24 projecting out from the hollow housing 28, with the upper and lower faces and the side faces at the two lengthwise ends being covered by the cushion covers 36.

The fastener plate 24 is mounted by welding, bolts, etc. onto the lower face of the hollow housing 28. The openings of the three housing spaces 26 in the hollow housing 28 are thereby covered in their entirety by the upper face of the fastener plate 24. The upper face of the fastener plate 24 at locations thereof situated facing the openings of the three housing spaces 26 is a flat surface extending in the horizontal direction over the entire face. The lower outside peripheral edge of the hollow housing 28 and the upper face of the fastener plate 24 juxtaposed thereagainst are in generally intimate contact, isolating the three housing spaces 26 from the space outside.

Figure 2:
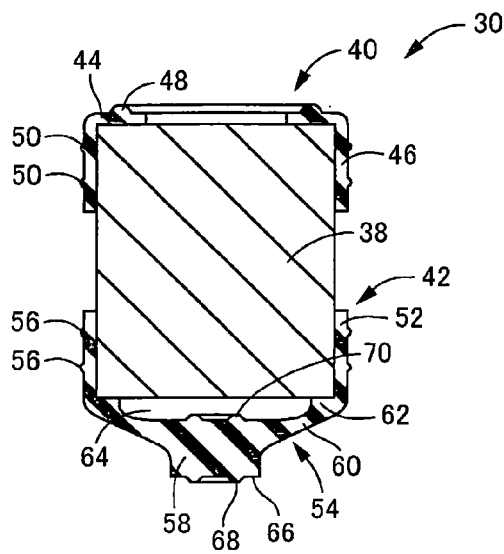
FIG. 2 is an enlarged vertical cross sectional view of an independent mass member of the vibration damping apparatus of FIG. 1.

The mass member 30 is housed within each of the housing spaces 26. FIG. 2 depicts the mass member 30. The mass member 30 is constructed with an upper cushion cover 40 attached to the axial upper end of a mass fitting 38 having solid cylindrical block shape, and with a lower cushion cover 42 attached to the axial lower end of the mass fitting 38.

The mass fitting 38 has a solid cylindrical block shape of circular cross section endowed with slightly smaller outside dimension than the inside diameter dimension of the housing space 26 and formed with an axial dimension smaller than the depth dimension of the housing space 26. It is formed of iron or other metal material of high specific gravity.

The upper cushion cover 40 has a tubular portion 46 of round tubular shape integrally formed so as to extend downward from the outside peripheral edge of an upper base portion 44 of annular disk shape, producing a rotating body contour that extends in the circumferential direction with a thin cross section of inverted "L" shape. On the upper face of the upper base portion 44 is integrally formed an annular rib projection 48 extending in the circumferential direction through the diametrically medial section and projecting axially upward; and on the outside peripheral face of the tubular portion 46 are integrally formed annular rib projections 50, 50 extending in the circumferential direction through the axially medial section and projecting diametrically outward.

The upper cushion cover 40 is integrally formed by a rubber elastic body which is a separate element from the mass fitting 38; the inside diameter dimension of the tubular portion 46 is slightly small than the outer dimension of the mass fitting 38. This separate upper cushion cover 40 is secured fitting externally onto the upper end of the mass fitting 38, performing an adhesive treatment if needed. Then, with the upper base portion 44 juxtaposed in intimate contact with the outside peripheral edge of the upper end face of the mass fitting 38, and the tubular portion 46 juxtaposed in intimate contact with the outside peripheral face of the upper end of the mass fitting 38, the corners of the upper end of the mass fitting 38 are covered in their entirety by the upper cushion cover 40.

A lower cushion cover 42 has a base wall portion 54 integrally formed in the axial lower section of a tubular portion 52 of round tubular shape; and is integrally formed by a rubber elastic body of generally bottomed round cylindrical shape overall which constitutes a separate element from the mass fitting 38. On the outside peripheral face of the tubular portion 52 are integrally formed annular ribs 56, 56 extending in the circumferential direction through the axially medial section and projecting diametrically outward.

In the center portion of the base wall portion 54 of the lower cushion cover 42 is integrally formed a strike portion 58 of block shape which projects axially downward with circular cross section; and a support leg portion 60 of tapered shape or funnel shape sloping towards the outside peripheral side at a prescribed angle axially upward from the outside peripheral face of the basal end (upper end) of the strike portion 58 is formed such that the outside peripheral edge of this support leg portion 60 is integrally linked with the lower peripheral edge of the tubular portion 52.

The inside diameter dimension of the tubular portion 52 is slightly smaller than the outside diameter dimension of the mass fitting 38, and the lower cushion cover 42 is secured fitting externally onto the lower end of the mass fitting 38, performing an adhesive treatment if needed. Specifically, the tubular portion 52 is juxtaposed in intimate contact against the outside peripheral face of the lower end of the mass fitting 38, and the support leg portion 60 of the base wall portion 54 is positioned extending over the lower end face of the mass fitting 38, whereby the lower end section, including the lower end face of the mass fitting 38, is covered in its entirety by the lower cushion cover 42.

At the outside peripheral edge of the upper end face of the support leg portion 60 is integrally formed a support projection 62 which projects upward in the connecting corner portion with the tubular portion 52 and which extends around the entire circumference in the circumferential direction; the outside peripheral edge of the support leg portion 60 is supported in contact against the outside peripheral edge of the lower end face of the mass fitting 38 by this support projection 62. Thus, with the lower cushion cover 42 installed on the mass fitting 38, the support leg portion 60 and the strike portion 58 are positioned substantially entirely below and spaced apart from the lower end face of the mass fitting 38, thus creating between the axially opposing faces of the support leg portion 60 and the strike portion 58 and the lower end face of the mass fitting 38 a hollowed space 64 that permits axial displacement of strike portion 58 on the basis of elastic deformation of the support leg portion 60.

Furthermore, the projecting distal end face (axial lower end face) of the strike portion 58 constitutes a strike face 66 of circular shape positioned on the center axis of the mass fitting 38 and extending perpendicular to this center axis. On the strike face 66 is integrally formed an annular rib projection 68 that extends in the circumferential direction through the diametrically medial section about the center axis and projects axially downward; this element is adapted to adjust initial spring characteristics when the strike face strikes 66 against the fastener plate 24, and to reduce noise etc.

In preferred practice, the strike portion 58 with the rib projection 68 will have at its strike face 66 Shore D hardness (per ASTM standard D2240) of 80 or lower and modulus of compression in the axial direction of between 1 and $10^4$ MPa, as well as loss tangent of $10^{-3}$ or above. On the axial upper end face of the strike portion 58 is integrally formed an annular rib projection 70 that extends in the circumferential direction about the center axis and projects axially upward. The rib projection 70, which projects towards the axial lower end face of the mass fitting 38 within the hollowed space 64 is designed to ameliorate shock and noise when the strike portion 58 strikes the mass fitting 38 during excessive deformation of the support leg portion 60.

While not illustrated in detail, in the present embodiment, in order to adjust the spring characteristics of the support leg portion 60, thin portions of arcuate shape each of prescribed width and having length approximately equal to one-fourth of the circumference in the circumferential direction are formed in the inside peripheral edge section of the lower end face of the support leg portion 60, to either side of the strike portion 58. A through-hole perforates the center section of each thin portion; the hollowed space 64 communicates with the outside (i.e. with the housing space 26) through these through-holes, whereby the hollowed space 64 acts as an air spring, while not hampering displacement of the mass fitting 38, discussed later.

The mass members 30 described above are installed housed within the three housing spaces 26 of the hollow housing 28. When installed in this way, the mass members 30 are able to ricochet in the axial direction within the housing spaces 26 and undergo reciprocating displacement independent of the hollow housing 28.

In the present embodiment, the mass members 30 are designed so that the rib projections 50, 56 in the tubular portions 46, 52 of the upper and lower cushion covers 40, 42 of maximum outside diameter dimension each have outside diameter dimension smaller by between 0.1 and 1.6 mm than the inside diameter dimension of the housing spaces 26 of the hollow housing 28. Thus, the axial dimension from the projecting distal end of the rib projection 48 on the upper base portion 44 of the upper cushion cover 40 to the projecting distal end of the rib projection 68 on the strike face 66 of the strike portion 58 of the lower cushion cover 42, which represents the maximum axial length dimension, is at least 1.0 mm smaller, and preferably between 1.0 and 3.0 mm smaller, than the distance between the opposing faces of the upper base face of the housing space 26 and the upper face of the fastener plate 24. The maximum axial length dimension of the mass member 30 is based on that with the mass member 30 stationary, and the lower cushion cover 42 elastically deformed by a prescribed amount under the weight of the mass fitting 38.

In all likelihood, if the diametrical gap between the mass member 30 and the housing space 26 is too small, during vibration input the mass member 30 will tend to slide easily along the inside wall of the housing space, making it difficult to effectively achieve relative axial displacement of the mass member 30 with respect to the hollow housing 28 and vibration damping action on the basis thereof. On the other hand if the diametrical gap between the mass member 30 and the housing space 26 is too large, during vibration input the mass member 30 will tend to experience tilting or other irregular displacement, making it difficult to achieve consistent vibration damping action. In the axial direction of the mass member 30, meanwhile, there will be no problems as long as the size of the housing space 26 is such that the mass member 30 is substantially independently displaceable with the respect to the hollow housing 28, but if this is too large it will constitute a waste of space.

In order for the strike face 66 of the lower cushion cover 42 to separate completely from the upper face of the fastener plate 24 during ricochet displacement of the mass member 30 it will be necessary to ensure in the axial dimension of the housing space 26 the equivalent of the axial length of the mass member 30 in the absence of the influence of the weight of the mass fitting 38 and of deformation of the lower cushion cover 42. Otherwise, it is sufficient for the mass member 30 to exert effective repeated load (dynamic load) on the hollow housing 28 through relative displacement with respect to the hollow housing 28, and it will not be necessary for the strike face 66 of the lower cushion cover 42 to physically separate from the upper face of the fastener plate 24 during ricochet displacement of the mass member 30. In the present embodiment in particular, the direction of displacement of the mass member 30 is approximately coincident with the direction of gravity and the mass member will be returned to the home position under the effect of gravity. Thus it will not be necessary for the upper cushion cover 40 to strike the upper base face of the housing space 26 during input of vibration to be damped, making it possible to achieve the desired vibration damping action simply through striking of the lower cushion cover 42 against the fastener plate 24 and exerting effective repeated load thereby.

Meanwhile, in the present embodiment in particular, a lower damper mass 22b is installed on the opposite side of the fastener plate 24 from the upper damper mass 22a, i.e., on the lower face of the fastener plate 24. The lower damper mass 22b is generally similar in structure to the upper damper mass 22a and will not be described in detail except to note that the hollow housing 28 constituting the lower damper mass 22b is attached to the fastener plate 24 in a condition equivalent to flipping the hollow housing 28 in the upper damper mass 22a top to bottom, i.e. with the openings of the three housing spaces 26 covered in their entirety by the lower face of the fastener plate 24. The upper outside peripheral edge of the hollow housing 28 and the lower face of the fastener plate 24 juxtaposed thereagainst are in generally intimate contact, isolating the three housing spaces 26 from the space outside.

Mass members 30 of similar structure to those in the upper damper mass 22a described earlier are housed within these three housing spaces 26. While the mass members 30 housed in the lower damper mass 22b have similar structure to the mass members 30 housed in the upper damper mass 22a, the mass members 30 housed in the lower damper mass 22b are housed with their vertical direction oriented identically to the mass members 30 housed in the upper damper mass 22a. Specifically, the three mass members 30 housed in the hollow housing 28 of the lower damper mass 22b are arranged housed therein with the upper cushion cover 40 positioned plumb-vertically above and the lower cushion cover 42 positioned plumb-vertically below, and with the rib projection 68 and the strike face 66 of the strike portion 58 of the lower cushion cover 42 contacting the lower base face of the housing space 26 formed in the hollow housing 28.

In the present embodiment, the damper mass 14 is thereby constituted by mounting the upper damper mass 22a on the upper side of the fastener plate 24 and the lower damper mass 22b on the lower side. The total mass of the damper mass 14 will preferably equal between 5 and 15% of the mass of the vibrating member 20. The reason is that if the mass of the damper mass 14 is less than 5% of the mass of the vibrating member 20, it may be difficult to achieve effective vibration damping action in some instances, whereas in excess of 15% the increased weight of the apparatus as a whole tends to be problem. Furthermore, in order to achieve effective vibration damping action based on striking against the hollow housing 28, it is preferable for the mass of the independent mass members 30 to be such that total mass of the several mass members 30 is equal to between 5 and 10% of the mass of the vibrating member 20. Where multiple such vibration damping apparatus 10 are furnished to a vibrating member 20, the total mass of all of the damper masses 14 provided to the multiple vibration damping apparatus 10 will preferably be equal to between 5 and 15% of the mass of the vibrating member 20; and the total mass of all of the independent mass members 30 will preferably be equal to between 5 and 10% of the mass of the vibrating member 20.

Figure 3:
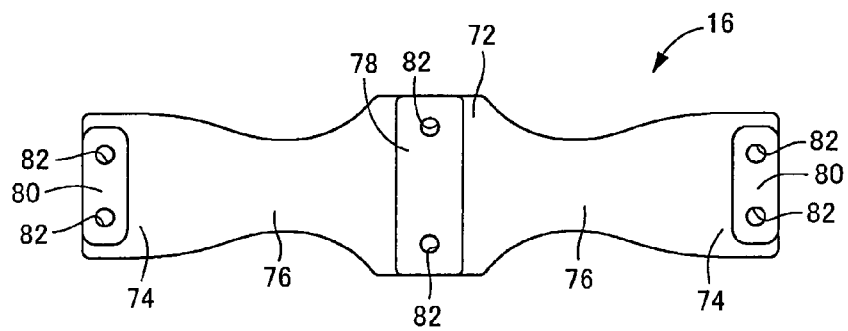
FIG. 3 is a top plane view of a plate spring of the vibration damping apparatus of FIG. 1.

The damper mass 14 having the structure described above is attached to the two brackets 12a, 12b via the plate spring stuffs 16 and the rubber bushings 18 disposed at top and bottom. FIG. 3 depicts the upper face of one of the plate spring stuffs 16. The plate spring stuff 16 is fabricated of sheet steel or other metal and has a thin contour extending with generally unchanging thickness dimension. The plate spring stuff 16 is also left-right symmetrical in shape, with its width dimension in top view varying along the lengthwise direction, becoming widest in its center portion 72, and with its medial portions extending towards end portions 74 situated at both ends constituting necked portions 76 that are bowed at the edges on either side so as to create the smallest width dimension. In top view the two end portions 74 have equal width dimension, with the width dimension of the two end portions 74 being somewhat smaller than the width dimension of the center portion 72.

A center attachment plate 78 of strip shape is welded to the upper face of the center portion 72 of the plate spring stuff 16, and an end attachment plate 80 of strip shape is welded to the upper face at each of the two end portions 74. The center attachment plate 78 and the end attachment plates 80, like the plate spring stuff 16, are fabricated of steel sheet etc.; the lengthwise dimension of the center attachment plate 78 is equal to the lengthwise dimension of the center portion 72, while the lengthwise dimension of the end attachment plates 80 is slightly smaller than the lengthwise dimension of the end portions 74. These are each welded to the plate spring stuff 16 so as to extend across its width. Pairs of through-holes 82 perforating through the thickness of the center attachment plate 78 or end attachment plate 80 and the plate spring stuff 16 therebelow are formed in a row in the lengthwise direction of the attachment plates 78, 80, in other words, along the width of the plate spring stuff 16.

Meanwhile, the rubber bushings 18 which support the two ends portions 74 of the plate spring stuff 16 have a structure in which an inner tubular fitting 86 constituting an inner shaft member of round tubular shape having outside diameter dimension smaller than the inside diameter dimension of an outer tubular fitting 84 constituting an outer tubular member of round tubular shape is positioned inserted through the outer tubular fitting 84 so as to be coaxial therewith and spaced apart diametrically therefrom, with the two fittings linked in the diametrical direction by a main rubber elastic body 88 as the rubber elastic body. More specifically, a bushing internal member 89 constituted to include the inner tubular fitting 86 and the main rubber elastic body 88 is secured press-fit into the outer tubular fitting 84. The bushing internal member 89 is a vulcanization-molded component produced by inserting the inner tubular fitting 86 into a press-fit tubular fitting 91 of thin-walled round tubular shape having outside diameter dimension slightly smaller than the inside diameter dimension of the outer tubular fitting 84 and axial dimension approximately equal to the axial dimension of the outer tubular fitting 84, and positioning the inner tubular fitting 86 therein so as to be coaxial therewith and spaced apart diametrically therefrom; filling the space between the press-fit tubular fitting 91 and the inner tubular fitting 86 with the main rubber elastic body 88; and subjecting these to integral vulcanization molding. The press-fit tubular fitting 91 of the bushing internal member 89 is then subjected to a constriction process to pre-compress the main rubber elastic body 88, and the bushing internal member 89 is then press-fit into the outer tubular fitting 84. A rubber bushing 18 in which the inner tubular fitting 86 is positioned passing coaxially through the outer tubular fitting 84, and in which the outer tubular fitting 84 and the inner tubular fitting 86 are linked in the diametrical direction by the main rubber elastic body 88, is formed thereby.

Figure 4:
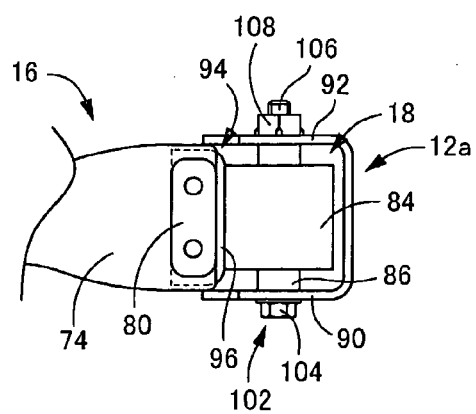
FIG. 4 is a top plane view of an attachment portion of the plate spring of the vibration damping apparatus of FIG. 1.

As shown in FIG. 4, the axial dimension of the inner tubular fitting 86 is such that it spans the distance between the front wall portion 90 and the rear wall portion 92 of the bracket 12a which has a generally three-sided square contour in top view, and is somewhat larger than the axial dimension of the outer tubular fitting 84. The main rubber elastic body 88 disposed between the outer tubular fitting 84 and the inner tubular fitting 86 has a round tubular contour extending straight with an unchanging annular cross section.

A linking member 94 is welded to the outside peripheral face of the outer tubular fitting 84. The linking member 94 is formed of metal etc. similar to the outer tubular fitting 84 and the inner tubular fitting 86; and has a generally "<" shaped cross section contour with a flat tabular portion 96 as well as a curving portion 98 that extends from one edge of the tabular portion 96 and curves at curvature ratio approximately the same as the curvature ratio of the outside peripheral face of the outer tubular fitting 84. An upright wall 100 is integrally formed with the two edges of the linking member 94 in the width direction (the vertical direction in FIG. 4). Here, the width dimension of the linking member 94 is slightly larger than the axial dimension of the outer tubular fitting 84, and slightly smaller than the axial dimension of the inner tubular fitting 86 as well. The linking member 94 is then secured by welding to the outer tubular fitting 84, with the curving portion 98 juxtaposed against the outside peripheral wall of the outer tubular fitting 84. The linking member 94 is attached to the outer tubular fitting 84 such that, in the mounted state, an extended line in the direction of extension of the tabular portion 96 will pass through approximately the same center axis as the outer tubular fitting 84 and the inner tubular fitting 86.

Rubber bushings 18 constructed in this way are attached respectively to the upper and lower ends of the two brackets 12a, 12b. Since the method of attaching these four rubber bushings 18 to the brackets 12a, 12b is the same for each, the example of the rubber bushing 18 attached to the upper end of the bracket 12a as shown in FIG. 4 will be described here. First, with the linking member 94 facing the open side of the bracket 12a (the left side in FIG. 4), the rubber bushing 18 is inserted between the front wall portion 90 and the rear wall portion 92 of the bracket 12a. Here, the upper ends of the front and rear wall portions 90, 92 of the bracket 12a are perforated by bolt holes (not shown) having outside diameter dimension approximately equal to the inside diameter dimension of the inner tubular fitting 86. The rubber bushing 18 is positioned so that the center axis of the inner tubular fitting 86 is aligned with the center axes of the bolt holes made in the bracket 12a. Then, in the positioned state, a bolt 102 is passed through the bolt holes and the inner tubular fitting 86, from the outside of either the front or rear wall portion 90, 92 of the bracket 12a (in FIG. 4, from the front wall portion 90).

The axial dimension of the bolt 102 is greater than the width dimension of the bracket 12a in the front-back direction; the bolt 102 is passed through the bracket 12a in the front-back direction with its head 104 detained by the outside face of either the front or rear wall portion 90, 92 (in FIG. 4, from the front wall portion 90), and with its distal end 106 projecting to the outside of either the front or rear wall portion 90, 92 (in FIG. 4, the rear wall portion 92). A nut 108 is then tightened onto the distal end 106 projected to the outside of the bracket 12a, and the nut 108 is secured by welding to the outside face of either the front or rear wall portion 90, 92 (in FIG. 4, the rear wall portion 92), thereby attaching the bolt 102 so as to span the bracket 12a front to back. The rubber bushing 18 attached to the bracket 12a through the inner tubular fitting 86 of the rubber bushing 18 fitting on the outside of the bolt 102.

The nut 108 is tightened to an extent such that the front and rear wall portions 90, 92 of the bracket 12a clamp and compress the two axial end faces of the inner tubular fitting 86 of the rubber bushing 18, rendering the rubber bushing 18 unable to turn with respect to the bracket 12a. In this attached state, slight gaps form between the two side edges of the linking member 94 and the front and rear wall portions 90, 92. Each rubber bushing 18 is attached in such a way that the curving portion 98 its respective linking member 94 is positioned to the inside of the brackets 12a, 12b. Thus, as will be apparent from FIG. 1, the rubber bushings 18 installed at the upper ends and lower ends of the brackets 12a, 12b are attached facing in mutually opposite directions top and bottom.

Optionally, a locking mechanism or the like could be employed to prevent the rubber bushing 18 from turning. In the present embodiment, the inner tubular fitting 86 having a tubular contour is used as the inner shaft member. However, it would be acceptable for example to instead use a solid shaft member as the inner shaft member, and to arrange this shaft member so as to pass through through-holes perforating the front and rear wall portions 90, 92 to attach the rubber bushing 18 to the bracket 12*a*; and to employ a locking mechanism etc. to prevent the rubber bushing 18 from turning. Furthermore, whereas in the present embodiment the main rubber elastic body 88 is linked to the outer tubular fitting 84 via the press-fit tubular fitting 91, the main rubber elastic body 88 could instead be linked directly to the outer tubular fitting 84 and the inner tubular fitting 86, without the intervening press-fit tubular fitting 91.

The plate spring stuffs 16 are attached to the rubber bushings 18 installed at both the upper and lower end of each bracket 12*a*, 12*b*. Each of the plate spring stuffs 16 is positioned with the face thereof situated opposite that to which the end attachment plates 80 are attached to the end portions 74 juxtaposed against the tabular portion 96 of the linking member 94 of the rubber bushings 18, and are affixed to the tabular portion 96 by rivet welds, bolts, etc. Here, an end attachment plate 80 edge lying towards the center portion 72 and the distal edge of the tabular portion 96 projecting towards the center portion 72 are aligned in approximately the same position in top view, thereby securely holding the end portion 74 of the plate spring stuffs 16 clamped from above and below, while not constraining deformation in areas other than those juxtaposed against the tabular portions 96.

With this arrangement, the two end portions 74 of the pair of plate spring stuffs 16 are affixed to the rubber bushings 18 provided at the upper and lower ends of the brackets 12*a*, 12*b*; and the two brackets 12*a*, 12*b* are linked by the rubber bushings 18 disposed at top and bottom, and by the pair of plate spring stuffs 16 spanning therebetween. The plate spring stuffs 16 are positioned spaced apart in the direction of input of vibration to be damped (the vertical direction in FIG. 1) as well.

The damper mass 14 having the structure discussed earlier is then positioned between the plate spring stuffs 16, 16 which respectively span the top and bottom of the brackets 12*a*, 12*b*. The damper mass 14 is attached with the support projection 32 projected from the hollow housing 28 of the upper damper mass 22*a* juxtaposed against the center portion 72 of the plate spring stuff 16 situated on the top side, by passing the mounting bolt 110 through the through-hole 82 perforating the center portion 72 of the plate spring stuff 16 and inserting it into the screw hole 34 of the support projection 32 thereby attaching it to the plate spring stuff 16 situated on the top side; and with the support projection 32 of the hollow housing 28 of the lower damper mass 22*b* similarly juxtaposed against the center portion 72 of the plate spring stuff 16 situated on the bottom side and attached thereto by the mounting bolt 110. While not necessarily clear from the drawings, in the present embodiment, the screw holes 34, 34 corresponding in location to the through-holes 82, 82 of the plate spring stuffs 16 are formed in the support projections 32, 32; and the mounting bolts 110, 110 are inserted into the pair of screw holes 34, 34. That is, the damper mass 14 of the present embodiment is fastened to each of the plate spring stuffs 16 by there two mounting bolts 110, 110. The respective plate spring stuffs 16 are each attached to the damper mass 14 so as to be clamped between the upper end face of the hollow housing 28 support projection 32 and the center attachment plate 78 which is affixed to the center portion 72 of the plate spring stuff 16, and securely attached thereto under the clamping force of the mounting bolt 110 which is effectively exerted across the entire width of the center portion 72 of the plate spring stuff 16 through the agency of the center attachment plate 78. The dimension of the support projection 32 and the dimension of the center attachment plate 78 are approximately equal in plan view, and deformation is not constrained in areas of the plate spring stuffs 16 other than those pushed against by the center attachment plate 78.

In the present embodiment, the damper mass 14 is attached to the center portion 72 of the plate spring stuffs 16 in this way, with the two end portions 74 of the plate spring stuffs 16 extending out to either side of the damper mass 14 in the horizontal direction. Plate springs 111 serving as a pair of plate spring that span the damper mass 14 and the vibrating member 20 are constituted by sections of the plate spring stuff 16 situated to either horizontal side of the damper mass 14, i.e. between the center portion 72 and the end portions 74, with the plate spring stuff 16 center portion 72 which constitutes a first end portion of each plate spring 111 being attached to the damper mass 14, and the plate spring stuff 16 end portions 74 which constitute the other end portions of the plate springs 111 attached to the rubber bushings 18; and are mounted thereby on the vibrating member 20 via the rubber bushings 18 and the brackets 12*a*, 12*b*.

Furthermore, the plate spring stuffs 16 are left-right symmetrical, whereby an elastic support center axis 112 composed of multiple (in the present embodiment, four) plate springs 111 is established so as to pass in the plumb-vertical direction through the center of the plate spring stuffs 16. A vertical line passing through the center of gravity of the damper mass 14 is approximately aligned with the elastic support center axis 112 composed of the plate springs 111. With this arrangement, excitation force produced on the basis of displacement of the damper mass 14 and exerted on the plate spring stuffs 16 will be exerted generally along the elastic support center axis 112. Moreover, since the center of gravity of the damper mass 14 is situated approximately on the elastic support center axis 112 of the plate spring stuffs 16, irregular displacement of the damper mass 14 in the twisting direction etc. will be reduced, and displacement in the plumb-vertical direction will be produced consistently, during displacement excitation of the damper mass 14. Furthermore, in the present embodiment in particular, by positioning the plate spring stuffs 16 above and below the damper mass 14 and supporting the top and bottom of the damper mass 14 by the plate spring stuffs 16, irregular displacement of the damper mass 14 in the twisting direction etc. will be effectively reduced.

As mentioned earlier, the brackets 12*a*, 12*b* have a generally three-sided square contour in top view, with the front wall portion 90 and the rear wall portion 92 positioned in opposition. Slots 114 are formed in the vertical center section of the front and rear wall portions 92, and fastener wall portions 116 that extend upright towards the bracket 12 interior are formed on the upper and lower sides of the slots 114 and on the peripheral edges therebetween. The edges of the fastener plate 24 of the damper mass 14 are positioned within these slots 114. The height dimension of the slots 114 is such that displacement of the damper mass 14 is permitted during ordinary vibration input, within a range such that the cushion covers 36 provided at the two ends of the fastener plate 24 do not strike against the fastener wall portions 116. In the event that input of an impact load etc. gives rise to an excessive level of displacement, the fastener plate 24 will strike against the fastener wall portions 116 via the intervening cushion covers 36, thereby providing cushioned restriction of the amount of displacement by the damper mass 14 and the amount of elastic deformation of the plate spring stuffs 16 and the rubber bushings 18.

The vibration damping apparatus 10 having the structure described above is secured to the vibrating member 20 by attaching the rear wall portion 92 of the brackets 12a, 12b thereto with mounting bolts 118 etc. The damper mass 14 is thereby elastically mounted on the vibrating member 20 of the primary vibrating system, via the plate spring stuffs 16 and the rubber bushings 18, thereby constituting a secondary vibrating system in which the damper mass 14 serves as the mass, and the plate spring stuffs 16 and the rubber bushings 18 serve as springs, so as to afford overall dynamic damper functionality. Thus, through proper adjustment of the mass of the damper mass 14 and of the dynamic spring constant of the plate spring stuffs 16 and the rubber bushings 18, the characteristic frequency of the secondary vibrating system can be tuned to the frequency of the vibration to be damped in the vibrating member 20, so that the vibration damping action of the vibration damping apparatus is exerted on the vibrating member 20.

Moreover, since the vibration damping apparatus 10 has mass members 30 positioned housed within the interior of the damper mass 14 constituting the mass of the secondary vibrating system in such a way that they are independently displaceable in the vertical direction, which is also the direction of vibration input, through relative displacement of the mass members 30 with respect to the hollow housing 28 and their action of striking against the hollow housing 28 when vibration is input, the vibration damping action of the vibration damping apparatus 10 will be further improved and better vibration damping action with respect to the vibrating member 20 will be achieved.

Furthermore, in the present embodiment in particular, the two end portions 74 of the plate spring stuffs 16 are attached to the brackets 12a, 12b via main rubber elastic body 88 of the rubber bushings 18, and attached such that the direction of input of load exerted on the plate spring stuffs 16 by the damper mass 14 during vibration input will exert moment in approximately the circumferential direction of the main rubber elastic body 88 which has round tubular shape, in other words, in the torsional direction of the main rubber elastic body 88. Thus, the load bearing on the plate spring stuffs 16 during vibration input will act in the torsional direction of the main rubber elastic body 88 via the linking member 94 and the outer tubular fitting 84 of the rubber bushings 18, and low dynamic spring constant will be observed on the part of the main rubber elastic body 88. Consequently, in the event that the damper mass 14 has been induced to undergo displacement during vibration input, due to the ease of deformation by the main rubber elastic body 88 the two end portions 74 of the plate spring stuffs 16 will be able to deform in response to displacement of the damper mass 14, thereby reducing the tensile stress to which the plate spring stuffs 16 are subjected, and suppressing a sharp rise in the dynamic spring constant of the plate spring stuffs 16 in the form of tensile rigidity. As a result, satisfactory bending elasticity of the plate spring stuffs 16 can be advantageously assured, and a wider region affording linear characteristics of the plate spring stuffs 16 can be assured without having to increase the length dimension of the plate spring stuffs 16, so that better vibration damping action may be achieved. Additionally, since the length dimension of the plate spring stuffs 16 can be kept small, the vibration damping apparatus can be compact, and durability of the plate spring stuffs 16 can be advantageously assured as well.

In the present embodiment in particular, utilizing the length dimension from the center portion 72 to the end portions 74 of the plate spring stuff 16, there is constituted a lever having the center portion 72 where the damper mass 14 is attached as its working point and exerting load on the main rubber elastic body 88, whereby moment in the torsional direction may be effectively exerted on the main rubber elastic body 88, and torsional deformation of the main rubber elastic body 88 may be readily brought about.

Figure 5:
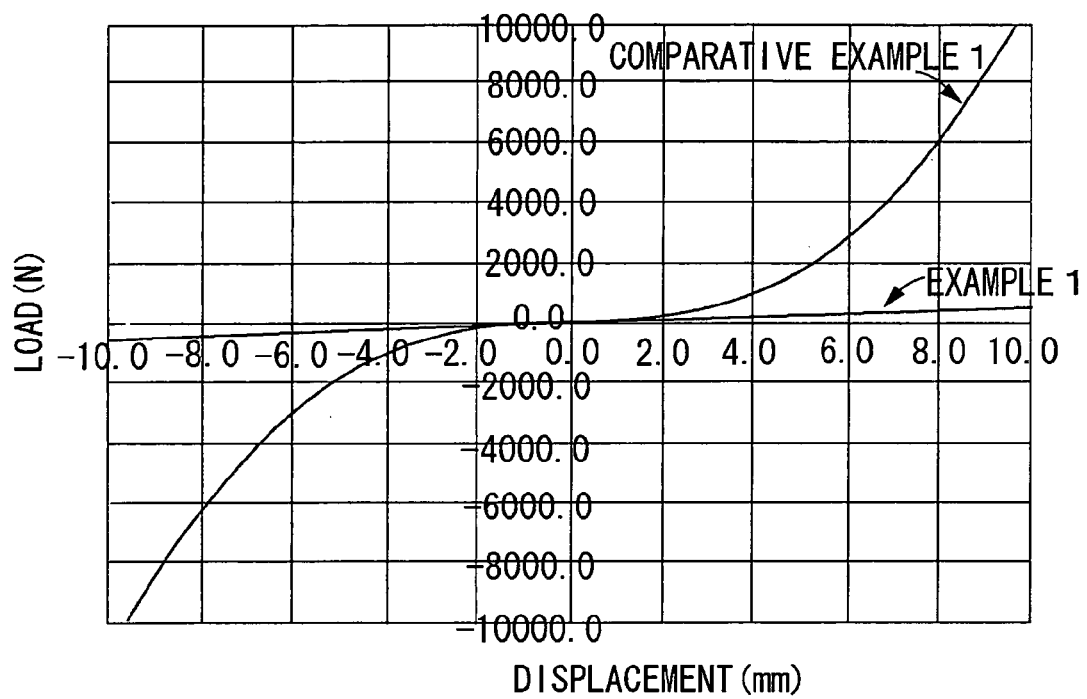
FIG. 5 is a graph demonstrating spring characteristics of the vibration damping apparatus of FIG. 1 together with a result of measurements regarding a comparative example.

FIG. 5 depicts by way of an example the results of measuring change in applied load when the plate spring stuffs 16 are induced to undergo displacement by a prescribed amount in the vibration damping apparatus 10 having the structure described above. The horizontal axis in FIG. 5 shows displacement of the plate spring stuffs 16 (unit: mm), and the vertical axis shows the load bearing on the plate spring stuffs 16 (unit: N). By way of a comparative example, FIG. 5 also shown as a comparative example the results of measurements made in the same way, but with the plate spring stuffs 16 attached directly to the brackets 12a, 12b without the rubber bushings 18 interposed.

As shown in FIG. 5, with the comparative example a sharp nonlinear change in characteristics of the plate spring stuffs 16 was observed in association with increasing deformation of the plate spring stuffs 16; whereas with the example of the vibration damping apparatus 10 having the aforementioned structure, linear characteristics of the plate spring stuffs 16 were assured over a wide range through deformation of the main rubber elastic body 88 provided to the rubber bushings 18.

Figure 6:
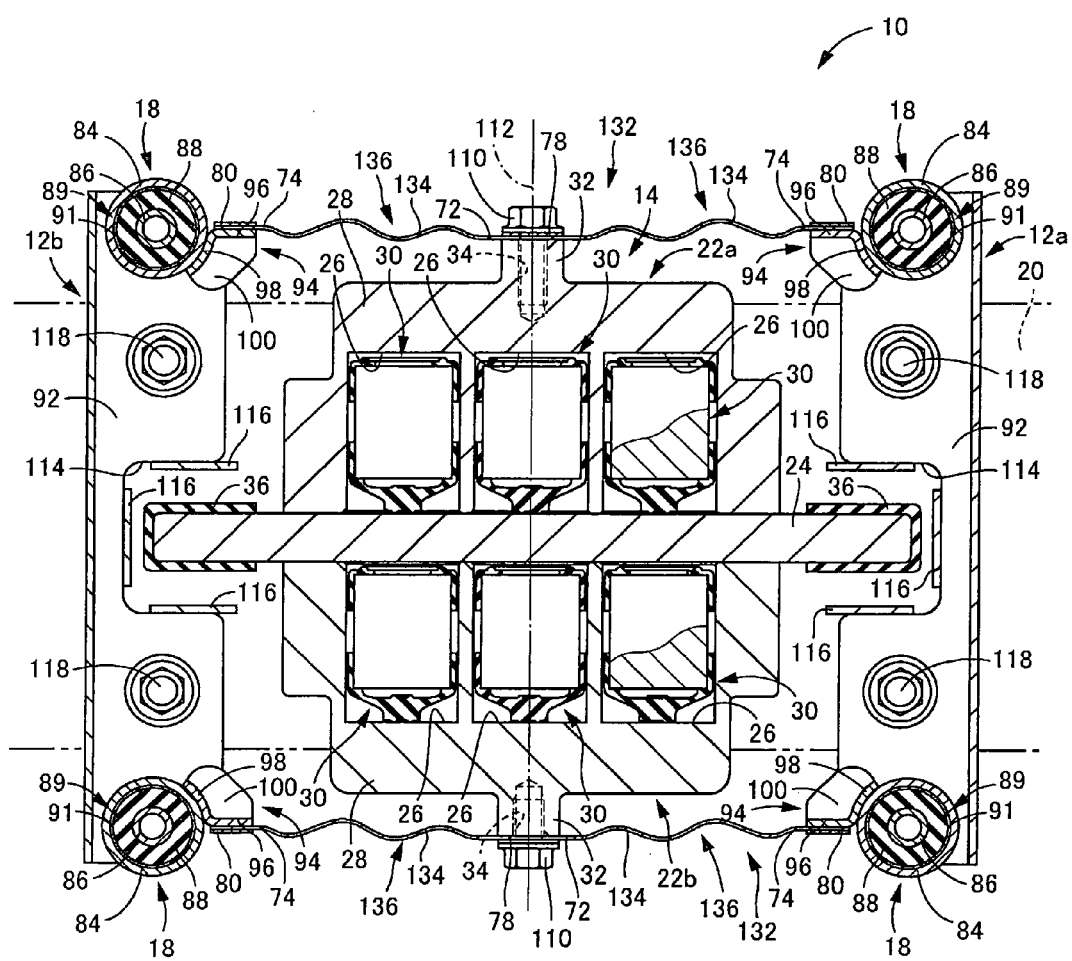
FIG. 6 is a vertical cross sectional view of a vibration damping apparatus of construction according to a second embodiment of the present invention.

Next, FIG. 6 depicts a vibration damping apparatus 130 pertaining to a second embodiment of the present invention. This embodiment shows a specific example of plate spring stuffs that differ in shape from those of the vibration damping apparatus 10 in the first embodiment; components and areas that are similar in structure to those of the vibration damping apparatus 10 pertaining to the first embodiment are identified in the drawings using the same symbols as in the first embodiment, and will not be discussed in any detail.

In the vibration damping apparatus 130 of the present embodiment, plate spring stuffs 132 which are bent in side view extend between rubber bushings 18 which are attached at the upper and lower ends of brackets 12a, 12b. The plate spring stuffs 132 have upper face contours similar to the plate spring stuffs 16 in the preceding first embodiment (see FIG. 2). The plate spring stuffs 132 in the present embodiment have bending portions 134 situated between the center portion 72 and the end portions 74 and bent in a corrugated pattern in side view. The number of corrugations formed in the bending portions 134 is not limited to any particular number. It would be acceptable, for example, to formed a multitude of corrugations having short length, or a single arcuate shape extending from the end portion 74 to the center portion 72. The bending portions 134 is formed in zones situated between the end portions 74 and the center portion 72 but excluding the areas where the end attachment plates 80 and the center attachment plate 78 are affixed; as with the plate spring stuffs 16 in the first embodiment, the areas where the end attachment plates 80 and the center attachment plate 78 are flat.

Like the plate spring stuffs 16 in the first embodiment, the pair of plate spring stuffs 132 having the above structure are respectively fastened with rivets or bolts to tabular portion 96 of the linking member 94 of the rubber bushings 18 attached to the upper ends of the brackets 12a, 12b and of the rubber bushings 18 attached to the lower ends of the brackets 12a, 12b, so as to span the distance between the two rubber bushings 18. The center portion 72 of the plate spring stuff 132 situated at top is then juxtaposed against the support projection 32 projecting from the hollow housing 28 which constitutes the upper damper mass 22a, and is secured in place by a mounting bolt 110; while the center portion 72 of the plate spring stuff 132 situated at bottom is juxtaposed against the support projection 32 projecting from the hollow housing 28 which constitutes the lower damper mass 22b, and is secured in place by a mounting bolt 110, thereby positioning the damper mass 14 between these two plate spring stuffs 132. As in the first embodiment discussed previously, by attaching the damper mass 14 to the plate spring stuffs 132 at their center portion 72, a pair of plate springs 136 situated to either side of the damper mass 14 are formed by sections of the plate spring stuffs 132 lying between their center portion 72 and their end portions 74; and the bending portions 134 are formed in these plate springs 136.

In the vibration damping apparatus 130 having the above structure, when the damper mass 14 is displaced, the bending portions 134 of the plate springs 136 will expand. It is possible thereby to ensure substantially large length dimension of the plate springs 136, and to suppress the occurrence of reaction force to extension of the plate springs 136. As a result, linear characteristics of the plate springs 136 can be assured over a wider range, and better vibration damping action will be possible.

While the present invention has been described hereinabove through certain preferred embodiments, these are merely exemplary and should not be construed as limiting the invention to the specific disclosure herein.

For example, the specific structure of the mass members used in the present invention is not limited to that in the preceding embodiments; it would of course be possible to provide independent mass members 30 in a number greater than or less than that taught in the embodiments above, by way of the number of mass members 30 housed within the damper mass 14. Moreover, the multiple mass members 30 housed in the damper mass 14 need not necessarily have identical shape and size, and may differ in size, for example. Furthermore, as the mass members it would be possible to employ mass members of block form, rather than independent mass members.

In the preceding embodiments, the plate springs are disposed at either side, i.e. both top and bottom, in the direction of vibration input to the mass members; however, it would be possible to provide a plate spring only at the top or bottom of the mass members.

Furthermore, whereas in the preceding embodiments the mass member is attached to the plate spring at the center portion so that the plate spring extends out to the left and right sides of the mass member allowing the mass member to be supported at the left and right sides, it would be acceptable to instead extend the plate spring to either the left or right side only, so that the mass member is supported in cantilever fashion at either the right or left side, for example.

Furthermore, the rubber bushings may be disposed on the mass member side, or disposed on both the mass member side and the vibrating component side. Consequently, in the damper mass 14 of the first embodiment for example, either the outer tubular fitting 84 or the inner tubular fitting 86 of the rubber bushings 18 could be attached to the damper mass 14, and the other attached to the plate spring stuffs 16.

The present invention is not limited to vibration damping of vibration in the plumb-vertical direction, and through proper alignment of the elastic support center axis of the spring members with the direction of input of vibration to be damped will afford effective vibration damping action against vibration in either the horizontal direction or on the diagonal.

Additionally, the vibration damping apparatus pertaining to the present invention should be understood as being applicable to a wide range of components whose vibration causes problems in an automotive body, sub-frame, engine block, seats, steering components, instrument panel, doors, mirrors etc., as well as various devices besides automobiles.

It is also to be understood that the present invention may be embodied with various other changes, modifications and improvements, which may occur to those skilled in the art, without departing from the spirit and scope of the invention defined in the following claims.

What is claimed is:

1. A vibration damping apparatus comprising:
a damper mass; and
a spring member for elastically supporting the damper mass on a vibrating member to be damped for constituting a secondary vibrating system for the vibrating member, the spring member comprising at least one plate spring of metal, one end of the plate spring being attached to the damper mass and the other end of the plate spring being attached to the vibrating member; and
a rubber bushing having an inner shaft member and an outer tube member positioned spaced apart from one another in a diametrical direction and linked in the diametrical direction by a rubber elastic body, the rubber bushing being positioned at a mounting location of the plate spring to at least one of the damper mass and the vibrating member, with one of the inner shaft member and the outer tube member of the rubber bushing fastened to the plate spring while the other of the inner shaft member and the outer tube member is fastened to the damper mass or the vibration damping apparatus where the rubber bushing is positioned,
wherein moment is exerted in a torsional direction of the rubber bushing during displacement of the damper mass by vibration to be damped, and
the secondary vibrating system has a free-hanging configuration such that the secondary vibrating system freely vibrates without being directly influenced by any portion that contacts the ground.

2. The vibration damping apparatus according to claim 1, wherein the spring member comprises a plurality of plate springs of metal, and at least one plate spring is positioned at a location away from at least another plate spring in a direction of vibration to be damped with the damper mass disposed between the two plate springs.

3. The vibration damping apparatus according to claim 1, wherein the spring member comprises a plurality of plate springs of metal, and a center axis of elastic support composed of the plurality of plate springs coinciding with a vertical direction passing through a center of gravity of the damper mass.

4. The vibration damping apparatus according to claim 1, wherein a pair of the plate springs are constituted using a single plate spring stuff, by fastening a lengthwise center section of the plate spring stuff to the damper mass with two end sections of the plate spring stuff projecting to either side in a horizontal direction from the damper mass; and attaching the rubber bushing to a distal end portion of each of the pair of the plate springs that project out from the damper mass.

5. The vibration damping apparatus according to claim 4, wherein a center axis of elastic support composed of the pair of the plate springs coincides with a vertical direction passing through a center of gravity of the damper mass, and the distal end portion of each of the pair of the plate springs is attached to the vibrating member via the rubber elastic body of the rubber bushings, and attached such that a direction of input load exerted on the plate spring stuffs by the damper mass during vibration input will exert moment in a circumferential direction of the rubber elastic body which has round tubular shape.

6. The vibration damping apparatus according to claim 1, wherein the plate spring has a bending portion that appears bent in side view, situated between a location of attachment to the damper mass and a location of attachment to the vibrating member.

7. The vibration damping apparatus according to claim 1, wherein the damper mass has an independent mass member housed within a housing space formed in an interior of a hollow housing, with a minute gap provided between the independent mass member and an inside wall of the housing space to permit free displacement of the independent mass member independently of the hollow housing.

8. The vibration damping apparatus according to claim 1, wherein the damper mass serving as a mass cooperates with the plate spring as well as the rubber bushing, which both serve as the spring member, so as to afford dynamic damper functionality by the damper mass being displaced in a direction of vibration.

9. The vibration damping apparatus according to claim 7, wherein the independent mass member comprises two or more independent mass members that are independently displaceable with respect to each other and are each provided within separate housing spaces within the hollow housing.

* * * * *